US012717625B2

(12) United States Patent
Zhang

(10) Patent No.: US 12,717,625 B2
(45) Date of Patent: Aug. 25, 2026

(54) RESOURCE ALLOCATION METHOD AND APPARATUS, ELECTRONIC DEVICE, AND COMPUTER-READABLE STORAGE MEDIUM FOR TEST TASKS

(71) Applicants: VERISILICON MICROELECTRONICS (CHENGDU) CO., LTD., Chengdu (CN); VERISILICON MICROELECTRONICS (SHANGHAI) CO., LTD., Shanghai (CN); VERISILICON TECHNOLOGY (SHANGHAI) CO., LTD., Shanghai (CN); VERISILICON MICROELECTRONICS (NANJING) CO., LTD., Nanjing (CN); VERISILICON MICROELECTRONICS (HAINAN) CO., LTD., Haikou (CN); VERISILICON MICROELECTRONICS (BEIJING) CO., LTD., Beijing (CN)

(72) Inventor: Zhengqian Zhang, Chengdu (CN)

(73) Assignees: VERISILICON MICROELECTRONICS (CHENGDU) CO., LTD., Chengdu (CN); VERISILICON MICROELECTRONICS (SHANGHAI) CO., LTD., Shanghai (CN); VERISILICON TECHNOLOGY (SHANGHAI) CO., LTD., Shanghai (CN); VERISILICON MICROELECTRONICS (NANJING) CO., LTD., Nanjing (CN); VERISILICON MICROELECTRONICS (HAINAN) CO., LTD., Haikou (CN); VERISILICON MICROELECTRONICS (BEIJING) CO., LTD., Beijing (CN)

( * ) Notice: Subject to any disclaimer, the term of this patent is extended or adjusted under 35 U.S.C. 154(b) by 447 days.

(21) Appl. No.: 18/283,049

(22) PCT Filed: Aug. 26, 2022

(86) PCT No.: PCT/CN2022/115248
§ 371 (c)(1),
(2) Date: Sep. 20, 2023

(87) PCT Pub. No.: WO2024/040599
PCT Pub. Date: Feb. 29, 2024

(65) Prior Publication Data
US 2025/0077281 A1 Mar. 6, 2025

(51) Int. Cl.
*G06F 9/50* (2006.01)

(52) U.S. Cl.
CPC .......... *G06F 9/5016* (2013.01); *G06F 9/5022* (2013.01); *G06F 9/5044* (2013.01)

(58) Field of Classification Search
CPC ........................................ G06F 9/5016
(Continued)

(56) References Cited

U.S. PATENT DOCUMENTS

| | | | | |
|---|---|---|---|---|
| 11,204,813 | B2 * | 12/2021 | Dolgov | G06F 9/5016 |
| 2011/0072437 | A1 * | 3/2011 | Druyan | G06F 9/505 718/104 |

(Continued)

FOREIGN PATENT DOCUMENTS

| | | |
|---|---|---|
| CN | 107529180 A | 12/2017 |
| CN | 111966585 A | 11/2020 |

OTHER PUBLICATIONS

International Search Report and Written Opinion with regard to PCT/CN2022/115248 mailed May 8, 2023.

*Primary Examiner* — Charlie Sun
(74) *Attorney, Agent, or Firm* — BCF LLP

(57) ABSTRACT

A resource allocation method and apparatus, an electronic device, and a computer-readable storage medium are provided. The resource allocation method includes acquiring the test resource requirements required by the test task, obtaining the combined resource pools that satisfy the test resource requirements through grouping at least two of all existing test resources, selecting a target resource pool from the combined resource pools, and allocating resources of the target resource pool to the test task. This method can automatically generate dynamic resource pools according to the resource features. The test task can be matched to qualified resource pools according to the test resource requirements of the test, and then occupies corresponding test resources for testing.

11 Claims, 3 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 2017/0255491 | A1* | 9/2017 | Bradshaw | G06F 9/5061 |
| 2020/0194091 | A1 | 6/2020 | Thiruvengadam et al. | |
| 2020/0264921 | A1* | 8/2020 | Luo | G06F 9/5077 |
| 2023/0189075 | A1* | 6/2023 | Cheng | H04W 28/16<br>718/104 |

* cited by examiner

RESOURCE ALLOCATION METHOD AND APPARATUS, ELECTRONIC DEVICE, AND COMPUTER-READABLE STORAGE MEDIUM FOR TEST TASKS

TECHNICAL FIELD

The present disclosure relates to the field of computer technology, and more particularly, to a resource allocation method and apparatus, an electronic device, and a computer-readable storage medium.

BACKGROUND

During a test process, different numbers of devices with different features need to be added to a test environment for specific scenarios, such as device cascading or networking test. Generally, the description of test resources and the definition of test resource pools are fixed. If multiple resource pools are required, the test resources need to be allocated, combined, and divided manually. Manual allocation is not only time-consuming but also wastes human resources in the case of a large number of resources. Sometimes, it is even infeasible. As manual readjustment would be more difficult when the resources change, such as adding or deleting a resource, an automatic test resource allocation method is required for the management, allocation, measurement, and use of test resources.

SUMMARY

In view of this, the present disclosure aims to provide a resource allocation method and apparatus, an electronic device, and a computer-readable storage medium to address the current problem of manual resource allocation.

Embodiments of the present disclosure are implemented as follows.

In the first aspect, the embodiments of the present disclosure provide a resource allocation method, comprising steps of acquiring at least one test resource requirement required by a test task; obtaining combined resource pools that satisfy the at least one test resource requirement through grouping at least two of all existing test resources; and selecting a target resource pool from the combined resource pools, and allocating resources of the target resource pool to the test task.

In the embodiments of the present disclosure, the resource allocation efficiency is greatly improved and labor costs are reduced intensively by acquiring the at least one test resource requirement required by the test task, generating the combined resource pools according to the resource features (such as the test resource requirements), selecting the target resource pool therefrom, and allocating the target resource pool to the test task, so that the test task can test the corresponding test resources.

In combination with a possible implementation of the first aspect embodiment, the at least one test resource requirement comprises the number of test resources required by the test; the step of obtaining combined resource pools that satisfy the at least one test resource requirement through grouping at least two of all existing test resources comprises grouping all existing test resources randomly by the number of test resources, wherein the number of test resources of each resource pool in the combined resource pools is consistent with the number of test resources required by the test task.

In the embodiments of the present disclosure, when the at least one test resource requirement comprises the number of test resources required by the test, the combined resource pools satisfying the at least one test resource requirement can be obtained by grouping at least two of all existing test resources by the number of test resources, so that the combined resource pools can be flexibly adjusted according to the number of test resources required by the test.

In combination with a possible implementation of the first aspect embodiment, the at least one test resource requirement herein further comprise the target features that the test resources need to possess; after the step of combining at least two of all existing test resources randomly by the number of test resources required by the test, the method further comprises traversing each initial resource pool obtained through combination by the number of test resources, detecting at least one initial resource pool in which each test resource satisfies the target features, and reserving at least one initial resource pool hereinabove to obtain combined resource pools that satisfy the at least one test resource requirement.

In the embodiments of the present disclosure, when the at least one test resource requirement further comprise the target features required by the test resources, after the step of obtaining the corresponding initial resource pools through combination by the number of test resources, the initial resource pools are traversed in turn to detect at least one pool in which each test resource satisfies the target features, and the initial resource pools in which each test resource satisfies the target features are reserved to form the combined resource pools that meet the at least one test resource requirement, so that the combined resource pools can be quickly adjusted according to the at least one test resource requirement, facilitating the test resource management and improving the allocation efficiency.

In combination with a possible implementation of the first aspect embodiment, the step of selecting a target resource pool from the combined resource pools comprises randomly selecting a resource pool from the combined resource pools as the target resource pool, or selecting an idle resource pool from the combined resource pools as the target resource pool.

In the embodiments of the present disclosure, by randomly selecting a resource pool from the combined resource pools as the target resource pool, the target resource pool can be obtained quickly while the at least one test resource requirement required by the test task can be satisfied; or by selecting an idle resource pool from the combined resource pools as the target resource pool, problems of long test times or test failures due to insufficient resources can be avoided.

In combination with a possible implementation of the first aspect embodiment, after the step of allocating the resources of the target resource pool to the test task, the method further comprises marking the target resource pool as busy, wherein resources of the pool are not allocated.

In the embodiments of the present disclosure, after the step of allocating the resources of the target resource pool to the test task, the target resource pool is marked as busy, and the resources of the target resource pool are not allocated to other test tasks so as to avoid the problem of one resource being occupied by multiple test tasks, and long test times or test failures due to insufficient resources.

In combination with a possible implementation of the first aspect embodiment, after marking the target resource pool as busy, the method further comprises marking the target resource pool as idle, wherein the resources of the idle resource pool are allocated, after the test task based on the resources of the target resource pool is completed.

In the embodiments of the present disclosure, after the target resource pool is marked as busy, and the test task based on the resources of the target resource pool is completed, the target resource pool is marked as idle again so that if this target resource pool later satisfies the at least one test resource requirement of a certain test task, the resources of this target resource pool can be allocated to the corresponding test task.

In combination with a possible implementation of the first aspect embodiment, the method herein further comprises automatically adjusting the resources of the combined resource pools when the test resources change.

In the embodiments of the present disclosure, when the test resources change, the resources of the combined resource pools are adjusted automatically to obtain the combined resource pools containing all resources that satisfy the at least one test resource requirement.

In combination with a possible implementation of the first aspect embodiment, the step of automatically adjusting the resources in the combined resource pools comprises automatically finding resources that satisfy the at least one test resource requirement from all test resources to obtain the combined resource pools that contain all resources that satisfy the at least one test resource requirement.

In the second aspect, the embodiments of the present disclosure further provides a resource allocation apparatus that comprises an acquiring module, a managing module, and an allocating module, wherein the acquiring module is configured to acquire the at least one test resource requirement required by a test task; the managing module is configured to combine at least two of all existing test resources randomly by the number of test resources to obtain combined resource pools that satisfy the at least one test resource requirement; and the allocating module is configured to select target resource pools from the combined resource pools, and allocate resources of the target resource pools to the test task.

In the embodiments of the present disclosure, the combined resource pools can be generated automatically according to the resource features (such as the test resource requirements) by using the acquiring module to acquire the at least one test resource requirement of a test task, the managing module to obtain the combined resource pools that satisfy the at least one test resource requirement through grouping at least two of all existing test resources, and the allocating module to select the target resource pool from the combined resource pools and allocate resources from the target resource pool to the test task. Then, the target resource pool can be selected from the combined resource pools and allocated to the test task. This greatly improves resource allocation efficiency and reduces labor costs.

In combination with a possible implementation of the second aspect embodiment, the at least one test resource requirement comprises the number of test resources required by the test; the managing module is configured to combine at least two of all existing test resources randomly by the number of test resources to obtain the combined resource pools that satisfy the at least one test resource requirement, wherein the number of test resources in each resource pool in the combined resource pools is consistent with the number of test resources required by the test task.

In the embodiments of the present disclosure, when the at least one test resource requirement comprises the number of test resources required by the test, the combined resource pools that satisfy the at least one test resource requirement can be obtained by combining at least two of all existing test resources by the number of test resources required by the test. Thus, the combined resource pools can be flexibly adjusted according to the number of test resources required by the test.

In combination with a possible implementation of the second aspect embodiment, the at least one test resource requirement further comprises the target features required by the test resources; the managing module is configured to acquire initial resource pools by randomly grouping all existing test resources by the number of test resources required by the test, and then it traverses these initial resource pools in turn to detect at least one initial resource pool in which each test resource satisfies the target features; the combined resource pools that meet the at least one test resource requirement can be obtained by reserving at least one of the initial resource pools.

In the embodiments of the present disclosure, when the at least one test resource requirement further comprises the target features required by the test resources, after the corresponding initial resource pools are obtained through combination by the number of test resources, the initial resource pools are traversed in turn to detect at least one initial resource pool in which each test resource satisfies the target features. The initial resource pools in which each test resource satisfies the target features are reserved to form the combined resource pools that satisfy the at least one test resource requirement. The combined resource pools can then be quickly adjusted according to the at least one test resource requirement, facilitating the test resource management and improving the allocation efficiency.

In combination with a possible implementation of the second aspect embodiment, the allocating module is configured to randomly select a resource pool from the combined resource pools as the target resource pool, or select an idle resource pool from the combined resource pools as the target resource pool.

In the embodiments of the present disclosure, randomly selecting a resource pool from the combined resource pools as the target resource pool can obtain the target resource pool quickly while meeting the at least one test resource requirement required by the test task. Alternatively, selecting an idle resource pool from the combined resource pools as the target resource pool avoids problems of long test times or test failures due to insufficient resources.

In combination with a possible implementation of the second aspect embodiment, the managing module is further configured to mark the target resource pool as busy after the allocating module allocates the resources of the target resource pool to the test task, wherein resources in the busy target resource pool are not allocated.

In the embodiments of the present disclosure, the managing module marks the target resource pool as busy after the step of the allocating module allocating the resources of the target resource pool to the test task. In this way, these resources are not allocated to other tasks, so as to avoid long test times and even test failures due to insufficient resources as multiple test tasks occupy the same resources.

In combination with a possible implementation of the second aspect embodiment, after the step of the managing module marks the target resource pool as busy and the test task based on the resources of the busy target resource pool is completed, the managing module re-marks the target resource pool as idle, wherein resources in the idle resource pool are allocated.

In the embodiments of the present disclosure, after the step of the managing module marking the target resource pool as busy and the test task based on the resources of the busy resource pool being completed, the managing module re-marks the target resource pool as idle. Then, resources in the idle target resource pool can be allocated to the corresponding test task when the target resource pool meets the at least one test resource requirement of the task.

In combination with a possible implementation of the second aspect embodiment, the managing module is also used to automatically adjust resources in the combined resource pools when the test resources change.

In the embodiments of the present disclosure, when the test resources change, resources in the combined resource pool are adjusted automatically to obtain the combined resource pools that contain all the resources that meet the at least one test resource requirement.

In combination with a possible implementation of the second aspect embodiment, the managing module is configured to automatically find resources that satisfy the at least one test resource requirement from all test resources to obtain the combined resource pools that satisfy the at least one test resource requirement. In the third aspect, the embodiments of the present disclosure further provide an electronic device that comprises a memory and a processor, with the processor being connected to the memory. The memory is configured to store programs. The processor is configured to call the programs stored in the memory to execute the method provided by the embodiments in the first aspect and/or any possible methods provided by the implementations in combination with the first aspect embodiment.

In the fourth aspect, the embodiments of the present disclosure further provide a computer-readable storage medium, wherein computer programs are stored thereon. When these programs are run by the processor, they execute the method provided according to the first aspect embodiments and/or any possible implementations in combination with the first aspect embodiments.

Other features and advantages of the present disclosure are elaborated in the following description. The objectives and other advantages of the present disclosure can be realized and obtained through the structures specifically indicated in the written description and drawings.

BRIEF DESCRIPTION OF THE DRAWING

In order to clearly illustrate the technical solutions in the embodiments of the present disclosure or in the prior art, drawings used in the embodiments will be introduced below. Apparently, the drawings described below merely show some embodiments of the present disclosure. For common technicians in this field, other drawings can also be obtained in light of these drawings without paying creative efforts. With these drawings, the above and other objectives, features, and advantages of the present disclosure are shown more clearly. The same reference signs in all the drawings refer to the same parts. The drawings are not intentionally scaled down according to the original size. The point of presenting them is to show the gist of the present disclosure.

DETAILED DESCRIPTION OF IMPLEMENTATION

The technical solutions in the embodiments of the present disclosure are described below with reference to the drawings in the embodiments of the present disclosure.

It should be noted that similar reference signs and letters represent similar items in the following drawings, therefore, once a certain item is defined in one drawing, it is not needed to be defined or explained in subsequent drawings. Meanwhile, in the description of the present disclosure, relational terms such as "first" and "second" are merely for distinguishing one entity or operation from another entity or operation, while it is not necessarily required or implied that these entities or operations have any such practical relation or order therebetween. Moreover, terms "including", "containing" or any other variations thereof are intended to be non-exclusive, thus a process, method, article or device including a series of elements not only include those elements, but also include other elements that are not listed definitely, or further include elements inherent to such process, method, article or device. Without more restrictions, an element defined with the wordings "including a . . . " does not exclude presence of other same elements in the process, method, article or device including said element.

Moreover, the term "and/or" in the present disclosure is merely an association relationship describing associated objects, and indicates that there may be three relationships, for example, "A and/or B" may indicate three situations, namely, A exists alone, both A and B exist, and B exists alone.

In view of some specific test scenarios, such as device cascading or networking tests, different numbers of devices with different features need to be added to the test environment during the test. When there is a particularly large quantity of resource data, for example, more than 20 boards with different features requiring resource allocation, manual management is almost infeasible. Even if the resources can be manually allocated, manual readjustment of an already allocated resource pool would be workload-intensive and error-prone, if a resource is added or deleted.

In light of this situation, the embodiments of the present disclosure provide an automatic resource allocation method with which dynamic resource pools can be automatically generated according to the features of the defined test resources, and the test task can find the resource pools that satisfy the at least one test resource requirement required by the test and then occupy the corresponding test resources to execute the test.

Figure 1:
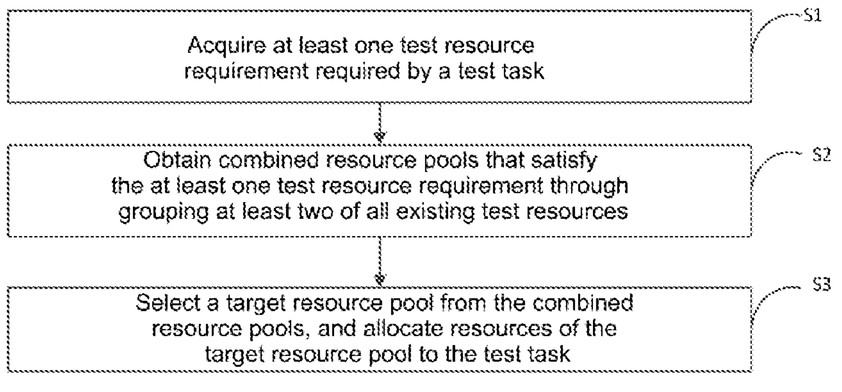
FIG. 1 shows the schematic flow chart of a resource allocation method provided in the embodiments of the present disclosure.

The resource allocation method provided by the embodiments of the present disclosure is described below in conjunction with FIG. 1.

S1: acquiring at least one test resource requirement required by a test task.

The at least one test resource requirement may be the ones required by the resource allocation apparatus to acquire the test tasks. Optionally, the requirements may be obtained by acquiring and parsing the JavaScript Object Notation (JSON) information in the test task.

JSON, a lightweight data interchange format, is easy to read and write by humans, and also easy to parse and generate by machines, which can effectively improve network transmission efficiency.

For example, the at least one test resource requirement may comprise: the number of test resources required by the test. Assuming that the number of boards required by the test is two, it can be expressed as {board: 2} in the JSON format. All resource pools satisfying the requirement of two boards can provide required test resources for test tasks.

As another example, in addition to the number of test resources required by the test, the at least one test resource requirement further comprises target features required by the test resources, such as, the operating system (OS) for test resources, the number of serial ports, whether Bluetooth is supported, and whether Wi-Fi (wireless network) is supported. Assuming that the test requires two boards, a Free Real-Time Operating System (FreeRTOS) as its OS, and two Universal Asynchronous Transmitter (UART) interfaces, the JASON format can be expressed as {board: 2, os: FreeRTOS, UART: 2}. It means the number of test resources (namely, boards) required by the test is two, the target features required by the test resources are that the operating system is FreeRTOS, and the number of UART interfaces is two. In this case, all resource pools that have the FreeRTOS system as the OS, two UART interfaces, and two boards can be used as the test resources required by the test task.

It should be noted that each test resource needs to be defined in advance, and added with specific feature identifiers during defining, such as the running operating system and the number of serial ports. For example, when defining four test resources, the identifiers should be as follows:

Board A runs the FreeRTOS operating system and has two serial ports;

Board B runs the Linux operating system and has three serial ports;

Board C runs the FreeRTOS operating system and has one serial port;

Board D runs the FreeRTOS operating system and has two serial ports.

Moreover, in addition to the above exemplary operating systems, the operating system may also be others, such as Windows system (an operating system developed on the basis of graphical user interface), iOS system (one type of mobile operating system), and Android system (one type of mobile operating system).

S2: obtaining combined resource pools that satisfy the at least one test resource requirement through grouping at least two of all existing test resources.

After acquiring the at least one test resource requirement required by the test task, the combined resource pools that satisfy the at least one test resource requirement through grouping at least two of all existing test resources are obtained.

For example, in an implementation, when the at least one test resource requirement comprises the number of test resources required by the test, for instance, when the at least one test resource requirement is {board: 2}, the process of obtaining the combined resource pools that satisfy the at least one test resource requirement through grouping at least two of all existing test resources may comprise randomly combining all existing test resources by the number of test resources required by the test to obtain combined resource pools satisfying the at least one test resource requirement, wherein the number of test resources corresponding to each resource pool in the combined resource pools is consistent with the number of test resources required by the test task.

For better understanding, description is made with reference to the above example. Assuming that all the existing test resources are as follows:

Board A runs the FreeRTOS operating system and has two serial ports;

Board B runs the Linux operating system and has three serial ports;

Board C runs the FreeRTOS operating system and has one serial port;

Board D runs the FreeRTOS operating system and has two serial ports.

Thus, all the combined resource pools A complying with the above {board: 2} comprise:

Pool 1: board A and board B;

Pool 2: board A and board C;

Pool 3: board A and board D;

Pool 4: board B and board C;

Pool 5: board B and board D.

As another example, in another embodiment, when the at least one test resource requirement further includes the target features (such as feature 1, feature 2, . . . , feature n, where n is a positive integer greater than or equal to 1) that the test resources need to have, for instance, {board: 2, os: FreeRTOS, UART: 2}, all the existing test resources are randomly combined by the number of test resources to obtain initial resource pools, which are then traversed in turn to detect at least one pool in which each test resource satisfies the target features. At least one initial resource pool is reserved to obtain the combined resource pools that meet the at least one test resource requirement. For example, each individual initial resource pool obtained through combination according to the number of test resources may be traversed in turn to determine whether each test resource in the pool satisfies the target feature. If it is satisfied, the pool is reserved, otherwise, it is removed. The same step is repeated until all initial resource pools are traversed. Initial resource pools that satisfy the target features are reserved to form the combined resource pools satisfying the at least one test resource requirement. Thus, all combined resource pools B that satisfy the condition {board: 2, os: FreeRTOS, UART: 2} include:

Pool 6: board A and board D.

Figure 2:
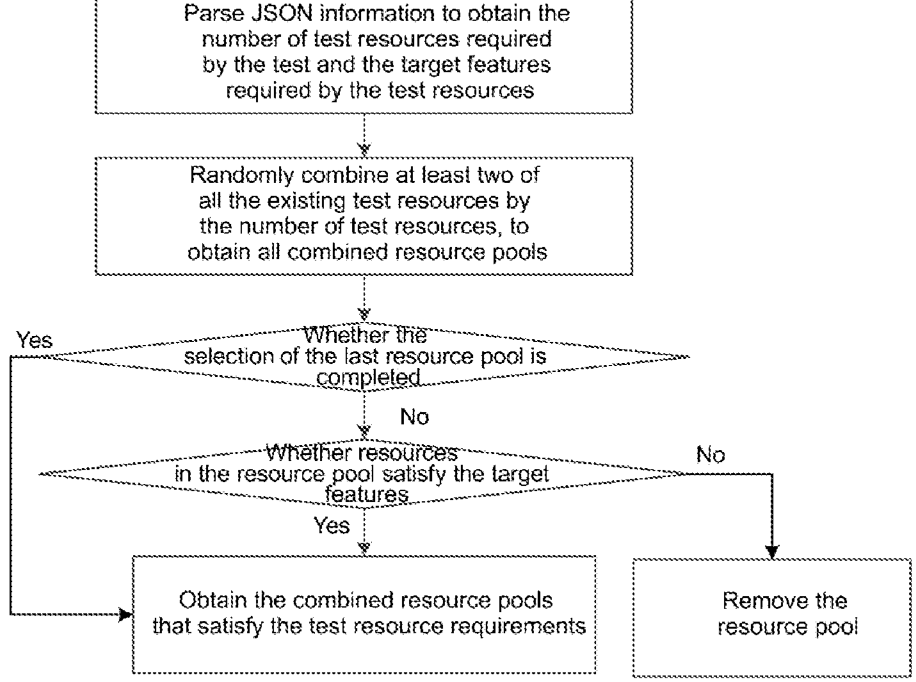
FIG. 2 shows the schematic diagram of dynamically generating the combined resource pools provided in the embodiments of the present disclosure.

The above process of obtaining the combined resource pools satisfying the at least one test resource requirement through combining at least two of all the existing test resources may be as shown in FIG. 2.

Figure 3:
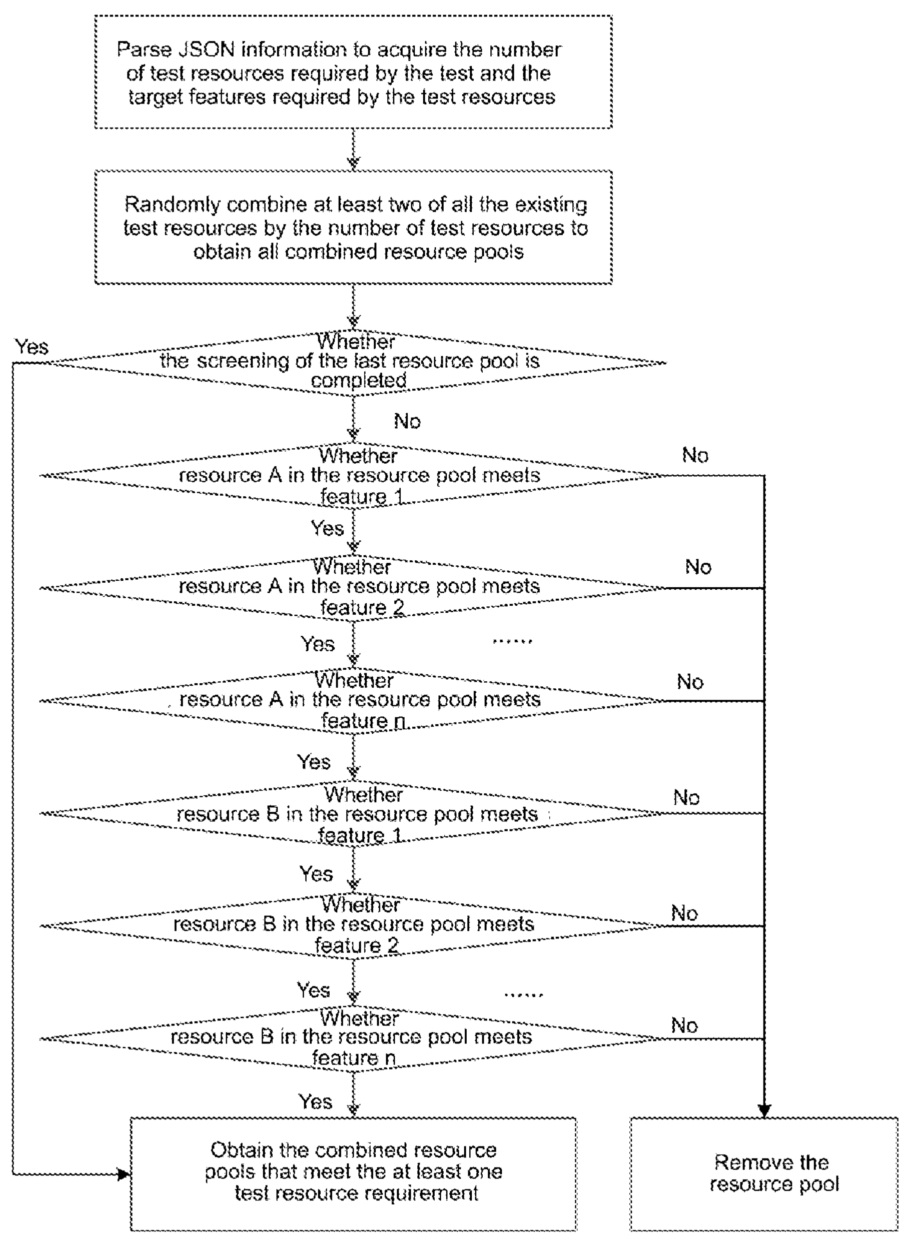
FIG. 3 shows another schematic diagram of dynamically generating the combined resource pools provided in the embodiments of the present disclosure.

Optionally, target features may include multiple features, such as feature 1, feature 2, . . . , and feature n. Whether the resources in the resource pools satisfy the target features may be determined by checking whether each resource in the resource pools satisfies these features in turn, for example, determining whether the resource A in the pool satisfies the feature 1, the feature 2, . . . , and the feature n, and determining whether the resource B in the pool satisfies the feature 1, the feature 2, . . . , and the feature n. The schematic diagram in FIG. 3 only shows the case where the resource pool contains two resources (namely, resource A and resource B). In fact, a resource pool may include more resources, such as resource C and resource D.

By properly setting the target features required by the test resources in the test task, at least one initial resource pool in which each test resource satisfies the target features can be obtained, and the required test resources can be allocated to the test task.

S3: selecting a target resource pool from the combined resource pools, and allocating resources of the target resource pool to the test task.

After the step of obtaining combined resource pools that satisfy the at least one test resource requirement through grouping at least two of all existing test resources, the target resource pool can be selected from the combined resource pools, and resources of the target resource pool are allocated to the test task. The target resource pool is one of the resource pools in the combined resource pools.

In an embodiment, the target resource pool may be a resource pool randomly selected from the combined resource pools.

In another embodiment, the target resource pool may be an idle resource pool selected from the combined resource pools. In this embodiment, optionally, after S3, the resource allocation method further comprises marking the target resource pool as busy, wherein the resources of the resource pool marked as busy are not allocated. In this way, resources of the resource pool marked as busy do not need to be allocated to other test tasks later on.

Correspondingly, after the target resource pool is marked as busy, the resource allocation method further comprises marking the target resource pool as idle, after the test task completes the test based on the resources of this busy target resource pool. Therefore, if this idle target resource pool subsequently satisfies the at least one test resource requirement of a certain test task, resources of this idle target resource pool can be allocated to this task.

Optionally, the resource allocation method further comprises adjusting the resources in the combined resource pools automatically when the test resources change, such as a test resource is deleted or newly added, wherein the process of automatically adjusting the resources in the combined resource pools may be automatically finding resources satisfying the at least one test resource requirement from all test resources to obtain combined resource pools that contain all resources satisfying the at least one test resource requirement.

For example, on the basis of the existing test resources of board A, board B, board C, and board D, a board E that runs the FreeRTOS operating system and has two serial ports is newly added.

In this case, the test resources are:

Board A runs the FreeRTOS operating system and has two serial ports;

Board B runs the Linux operating system and has three serial ports;

Board C runs the FreeRTOS operating system and has one serial port;

Board D runs the FreeRTOS operating system and has two serial ports;

Board E runs the FreeRTOS operating system and has two serial ports.

Thus, all the combined resource pools A complying with the above {board: 2} include:

Pool 1: board A and board B;

Pool 2: board A and board C;

Pool 3: board A and board D;

Pool 4: board B and board C;

Pool 5: board B and board D;

Pool 7: board A and board E;

Pool 8: board B and board E;

Pool 9: board C and board E;

Pool 10: board D and board E.

Thus, all combined resource pools B that satisfy {board: 2, os: FreeRTOS, UART: 2} include:

Pool 6: board A and board D;

Pool 11: board A and board E;

Pool 12: board D and board E.

As another example, on the basis of the existing test resources of board A, board B, board C, and board D, if the test resource board A is deleted, a resource pool will be dynamically regenerated according to the change and current condition, for instance, updating the resource pools in the above combined resource pools A to two pools:

Pool 4: board B and board C;

Pool 5: board B and board D.

If the number of resource pools in the above combined resource pools B is updated to 0, that is, there is no qualified resource pool, resource pools can be dynamically regenerated after the test resources change.

From the above description, it is known that when test resources change, with the resource allocation method described in the present disclosure, resources complying with the at least one test resource requirement are automatically found from all test resources, to form the combined resource pools containing all resources satisfying the at least one test resource requirement, the dynamic resource pools are automatically adjusted, and the resource pools satisfying various test resource requirements are flexibly generated for test programs.

Figure 4:
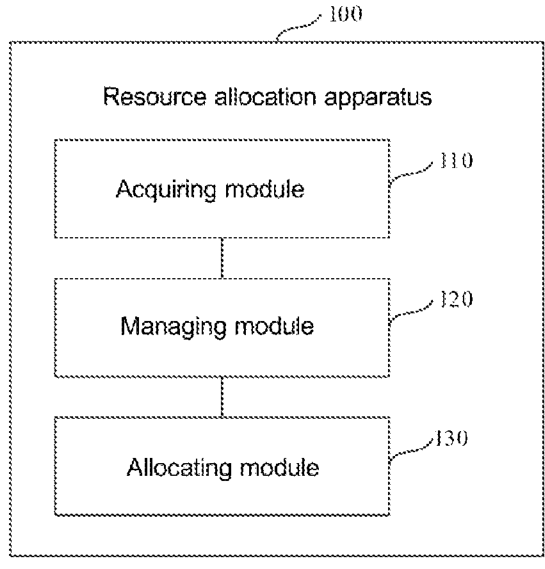
FIG. 4 shows the block diagram of a resource allocation apparatus provided in the embodiments of the present disclosure.

Based on the same inventive concept, an embodiment of the present disclosure provides a resource allocation apparatus 100, as shown in FIG. 4. It comprises an acquiring module 110, a managing module 120, and an allocating module 130.

The acquiring module 110 is configured to acquire at least one test resource requirement by a test task.

The managing module 120 is configured to obtain combined resource pools that satisfy the at least one test resource requirement through grouping at least two of all existing test resources.

The allocating module 130 is configured to select a target resource pool from the combined resource pools, and allocate resources of the target resource pool to the test task.

Optionally, the at least one test resource requirement comprises the number of test resources required by the test; the managing module 120 is configured to combine at least two of all existing test resources randomly by the number of test resources, to obtain combined resource pools that satisfy the at least one test resource requirement, wherein the number of test resources corresponding to each resource pool in the combined resource pools is consistent with the number of test resources required by the test task.

Optionally, the at least one test resource requirement further comprises the target features required by test resources; the managing module 120 is configured to after the step of combining at least two of all existing test resources randomly by the number of test resources, to obtain combined resource pools that satisfy the at least one test resource requirement, traverse each initial resource pool obtained through combination by the number of test resources in turn, to detect at least one initial resource pool in which each test resource satisfies the target features; and reserve at least one of the initial resource pools, to obtain the combined resource pools that meet the at least one test resource requirement.

Optionally, after the step of the allocating module 130 allocating resources of the target resource pool to the test task, the managing module 120 is further configured to mark the target resource pool as busy, wherein the resources of the resource pool marked as busy are not allocated.

Optionally, after the step of marking the target resource pool as busy, the managing module 120 is further configured to mark the target resource pool as idle, after the test task completes the test based on the resources of the busy target resource pool, wherein the resources of the resource pool marked as idle are not allocated.

Optionally, the managing module 120 is further configured to automatically adjust resources in the combined resource pools when the test resources change.

Optionally, the managing module 120 is configured to automatically find resources complying with the at least one test resource requirement from all test resources, to obtain the combined resource pools containing all resources that satisfy the at least one test resource requirement.

Optionally, the allocating module 130 is configured to randomly select a resource pool from the combined resource pools as the target resource pool, or select an idle resource pool from the combined resource pools as the target resource pool.

As regards the resource allocation apparatus 100 provided in the embodiment of the present disclosure, the implementation principle thereof and the technical effects produced thereby are the same as those in the preceding method embodiments. For the sake of concise description, reference can be made to corresponding contents in the aforementioned method embodiments for contents not mentioned in the apparatus embodiments.

Figure 5:
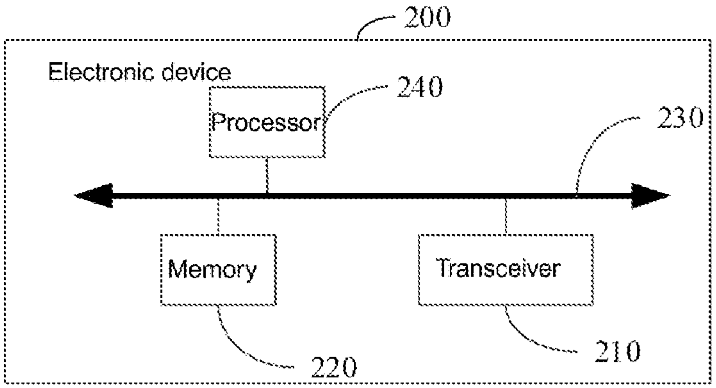
FIG. 5 shows the structure diagram of an electronic device provided in the embodiments of the present disclosure.

FIG. 5 shows the structure diagram of the electronic device 200 provided in the embodiments of the present disclosure. This device includes a transceiver 210, a memory 220, a communication bus 230, and a processor 240.

Among them, the transceiver 210, the memory 220, and the processor 240 are electrically connected to each other directly or indirectly to implement data transmission or interaction. For example, these components can be connected electrically via one or more communication buses 230 or signal lines. The transceiver 210 is configured to receive and send data. The memory 220 is configured to store computer programs, such as the software functional module in FIG. 4, namely, the resource allocation apparatus 100. This apparatus 100 includes at least one software functional module that can be stored in the memory 220 in a form of software or firmware, or integrated in an operating system (OS) of the electronic device 200. The processor 240 is configured to execute executable modules stored in the memory 220, such as software functional modules or computer programs included in the resource allocation apparatus 100. For example, the processor 240 is configured to acquire the at least one test resource requirement of the test task, obtain the resource pool satisfying the at least one test resource requirement through grouping at least two of all existing test resources, select a target resource pool from the combined resource pools, and allocate resources of the pool to the test task.

The memory 220 may be, but is not limited to, random access memory (RAM), read-only memory (ROM), programmable read-only memory (PROM), erasable programmable read-only memory (EPROM), and electric erasable programmable read-only memory (EEPROM).

The processor 240 may be an integrated circuit chip that can process signals. The processor herein may be a universal processor, such as central processing unit (CPU) and network processor (NP), a digital signal processor (DSP), an application-specific integrated circuit (ASIC), a field programmable gate array (FPGA) or other programmable logic devices, discrete gates, transistor logic devices, or discrete hardware components. The processor can realize or execute various methods, steps, and logic block diagrams disclosed in the embodiments of the present disclosure. The universal processor may be a microprocessor, and the processor 240 may also be any conventional processor.

The electronic device 200 herein includes but is not limited to computers and servers.

The embodiments of the present disclosure further provide a non-volatile computer-readable storage medium (hereinafter storage medium for short) that stores computer programs. When the computer programs are run by a computer, such as the electronic device 200, the resource allocation method hereinabove is executed.

It should be noted that various embodiments in the present disclosure are described in a progressive manner. Each embodiment focuses on the differences from others. For the same or similar parts, references can be made between each other.

In several embodiments provided in the present disclosure, the apparatus and the method disclosed may be realized by other methods. The apparatus embodiments described above are merely illustrative. For example, the flowcharts and the block diagrams in the drawings show possible system structures, functions, and operations of the apparatus, method, and computer program products described in multiple embodiments of the present disclosure. In this regard, each block in the flowchart or the block diagram may represent one module, program segment, or code segment, which contains one or more executable instructions to achieve a specified logical function. It should be noted that in some implementations as substitution, the functions indicated in the blocks also may take effect in an order different from that in the drawings. For example, two continuous blocks can be executed in parallel or in a reverse order. The order depends on the function involved. It also should be noted that each block or combination of the blocks in the block diagram and/or the flowchart can be realized by a dedicated hardware-based system used to execute a specified function or action, or can be realized by a combination of dedicated hardware and computer instructions.

Besides, functional modules in each embodiment of the present disclosure can exist independently or integrate with one or more modules to form an independent part.

If the function is realized in the form of a software functional module and is sold or used as an independent product, it may be stored in one computer-readable storage medium. Then, the technical solution of the present disclosure, the part that contributes to the prior art, or part of the solution can be embodied in form of a software product. This product is stored in a computer-readable storage medium and contains several instructions to enable one computer device (personal computer, laptop, server, or electronic device) to execute all or part of the steps of the methods described in the embodiments of the present disclosure. The aforementioned computer-readable storage medium can store program codes. It includes various media, such as USB flash disk, mobile hard disk, read-only memory (ROM), random access memory (RAM), diskette, and compact disk.

The above-mentioned are merely specific embodiments of the present disclosure, but the scope of protection of the present disclosure is not limited thereto, and any variation or substitution that may be easily conceived by a person skilled in the art within the technical scope disclosed in the present disclosure should fall within the scope of protection of the present disclosure. Therefore, the scope of protection of the present disclosure should be based on the scope of protection of the claims.

What is claimed is:

1. A resource allocation method for device cascading and networking tests, executed in a test resource scheduling system including a plurality of test boards, comprising steps of:

acquiring at least one test resource requirement required by a test task, wherein the test resource requirements comprise number of test boards, and target features of the test boards including operating system type required for the test boards, number of serial ports, and wireless network support capability;

combining at least two of all existing test resources from test resources randomly by the number of test boards required by the test, to obtain combined resource pools that satisfy the at least one test resource requirement, wherein the number of test boards in each resource pool in the combined resource pools is consistent with the number of test boards required by the test task, and each test board in the corresponding resource pool in the combined resource pools satisfies the target features; and selecting a target resource pool in an idle state from the combined resource pools, and allocating test resources corresponding to the target resource pool to the test task.

2. The method according to claim 1, wherein after the step of combining the at least two of all existing test resources from test resources randomly by the number of test resources required by the test, the method further comprises:

traversing each initial resource pool from initial resource pools obtained in turn, to detect at least one initial resource pool from the initial resource pools in which each test resource satisfies the target features; and reserving the at least one initial resource pool, to obtain the combined resource pools that satisfy the at least one test resource requirement.

3. The method according to claim 1, wherein the step of selecting the target resource pool in the idle state from the combined resource pools comprises:

randomly selecting an idle resource pool from the combined resource pools as the target resource pool.

4. The method according to claim 1, wherein after the step of allocating test resources corresponding to the target resource pool to the test task, the method further comprises:

marking the target resource pool as busy, wherein resources of the target resource pool marked as busy are not allocated.

5. The method according to claim 4, wherein after the step of marking the target resource pool as busy, the method further comprises:

marking the target resource pool as idle, after the test task completes the test based on the resources of the target resource pool, wherein the resources of the target resource pool marked as idle are allocated.

6. The method according to claim 1, wherein the method further comprises:

automatically adjusting resources in the combined resource pools when the test resources change.

7. The method according to claim 6, wherein the step of automatically adjusting the resources in the combined resource pools comprises:

automatically finding the resources in the combined resource pools complying with the at least one test resource requirement from all test resources from the test resources, to obtain combined resource pools containing all resources from the test resources that satisfy the at least one test resource requirement.

8. The method according to claim 1, wherein the method further comprises:

automatically adjusting resources in the combined resource pools when the test resources change.

9. An electronic device, comprising:

a memory and a processor, the processor being connected to the memory;

the memory being configured to store programs; and the processor being configured to call programs stored in the memory, to execute the method according to claim 1.

10. The method according to claim 1, wherein after the step of allocating the resources of the target resource pool to the test task, the method further comprises:

marking the target resource pool as busy, wherein resources of the target resource pool marked as busy are not allocated.

11. The method according to claim 10, wherein after the step of marking the target resource pool as busy, the method further comprises:

marking the target resource pool as idle, after the test task completes the test based on the resources of the target resource pool, wherein the resources of the target resource pool marked as idle are allocated.

* * * * *